United States Patent
Kelley

(10) Patent No.: US 11,062,277 B2
(45) Date of Patent: Jul. 13, 2021

(54) VIRTUAL CURRENCY MANAGEMENT IN A RETAIL ENVIRONMENT

(71) Applicant: NCR Corporation, Duluth, GA (US)

(72) Inventor: Aaron Lloyd Kelley, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 370 days.

(21) Appl. No.: 14/554,708

(22) Filed: Nov. 26, 2014

(65) Prior Publication Data

US 2016/0148173 A1     May 26, 2016

(51) Int. Cl.
| G06Q 20/06 | (2012.01) |
|---|---|
| G06Q 20/38 | (2012.01) |
| G06Q 20/36 | (2012.01) |
| G06Q 20/20 | (2012.01) |
| G06Q 30/02 | (2012.01) |

(52) U.S. Cl.
CPC ........... G06Q 20/065 (2013.01); G06Q 20/20 (2013.01); G06Q 20/36 (2013.01); G06Q 20/381 (2013.01); G06Q 30/0201 (2013.01)

(58) Field of Classification Search
CPC ........ G06Q 20/65; G06Q 20/20; G06Q 20/36; G06Q 20/381; G06Q 30/0201
USPC .......................................................... 705/16
See application file for complete search history.

(56) References Cited

U.S. PATENT DOCUMENTS

| 8,121,923 | B1* | 2/2012 | Ruccolo | G06Q 20/102 705/35 |
|---|---|---|---|---|
| 2001/0049660 | A1* | 12/2001 | Coventry | G06Q 20/1085 705/43 |
| 2008/0167965 | A1* | 7/2008 | Von Nothaus | G06Q 20/20 705/17 |
| 2010/0235270 | A1* | 9/2010 | Baker | G06Q 40/00 705/35 |
| 2011/0251906 | A1* | 10/2011 | Loevenguth | G06Q 20/10 705/16 |
| 2012/0130853 | A1* | 5/2012 | Petri | G06Q 30/0609 705/26.35 |
| 2013/0282559 | A1* | 10/2013 | Pappas | G06Q 20/02 705/39 |
| 2013/0290157 | A1* | 10/2013 | Troyanowski | G06Q 40/04 705/37 |
| 2015/0324880 | A1* | 11/2015 | Huang | G06Q 20/204 705/26.35 |
| 2015/0363778 | A1* | 12/2015 | Ronca | G06Q 20/065 705/71 |
| 2016/0098730 | A1* | 4/2016 | Feeney | G06Q 30/0185 705/71 |

* cited by examiner

Primary Examiner — Luna Champagne
(74) Attorney, Agent, or Firm — Schwegman, Lundberg & Woessner

(57) ABSTRACT

A Point-Of-Sale (POS) terminal is equipped to process virtual currencies for transactions. A rate checker obtains a real-time conversion rate for the virtual currencies to a government issued currency. The virtual currencies can be held or immediately exchanged for the government issued currency. Analysis of trends in exchange rates and policy drives when the virtual currencies are exchanged for the government issued currency.

19 Claims, 4 Drawing Sheets

VIRTUAL CURRENCY MANAGEMENT IN A RETAIL ENVIRONMENT

BACKGROUND

Virtual currencies have been exploding in the global economic scene. For the most part, younger individuals and countries with volatile currencies were the first adopters of virtual currencies.

There are a variety of benefits associated with transacting with virtual currencies. For example, there is no or very little transaction fee, which is an attractive proposition to retailers. Moreover, payment is simple" the payor scans the payee's digital wallet and then initiates a transfer of payment in the virtual currency from the payor's digital wallet to the payee's digital wallet. In the interim, there is a variety of confirmations that take place until the payee can confirm the appropriate amount of funds were transferred to the payee's digital wallet for a given transaction.

However, retailers have been reluctant to accept virtual currencies because of the volatility associated with these currencies. A retailer does not want to be holding a large sum of virtual currencies when the currency rapidly devalues.

To alleviate this concern, some third-party services will cash out a virtual currency payment for legal tender on behalf of a retailer in short order have a transaction. Such services also require fees for their services.

Yet, some currencies do not always devalue rapidly and some currencies actually increase in value. Moreover, there are some currencies (particularly Bitcoin™) that appear to be stabilizing and do not usually rapidly decline or rapidly appreciate in value. There is nothing particular special about a third-party service cashing out virtual currency for legal tender on behalf of a retailer.

Additionally, more and more retailers are accepting virtual currencies as a form of payment for transactions.

Therefore, there is a need for improved virtual currency management within a retail environment.

SUMMARY

In various embodiments, virtual currency management within a retail environment is presented. According to an embodiment, a method for virtual currency management is provided.

Specifically, a plurality of virtual currency exchanges is polled for exchange rates. Then, a current exchange rate is determined for a transaction from the exchange rates. Finally, an amount for a transaction at a Point-Of-Sale (POS) terminal is provided to the POS terminal in a virtual currency based on the current exchange rate.

DETAILED DESCRIPTION

Figure 1:
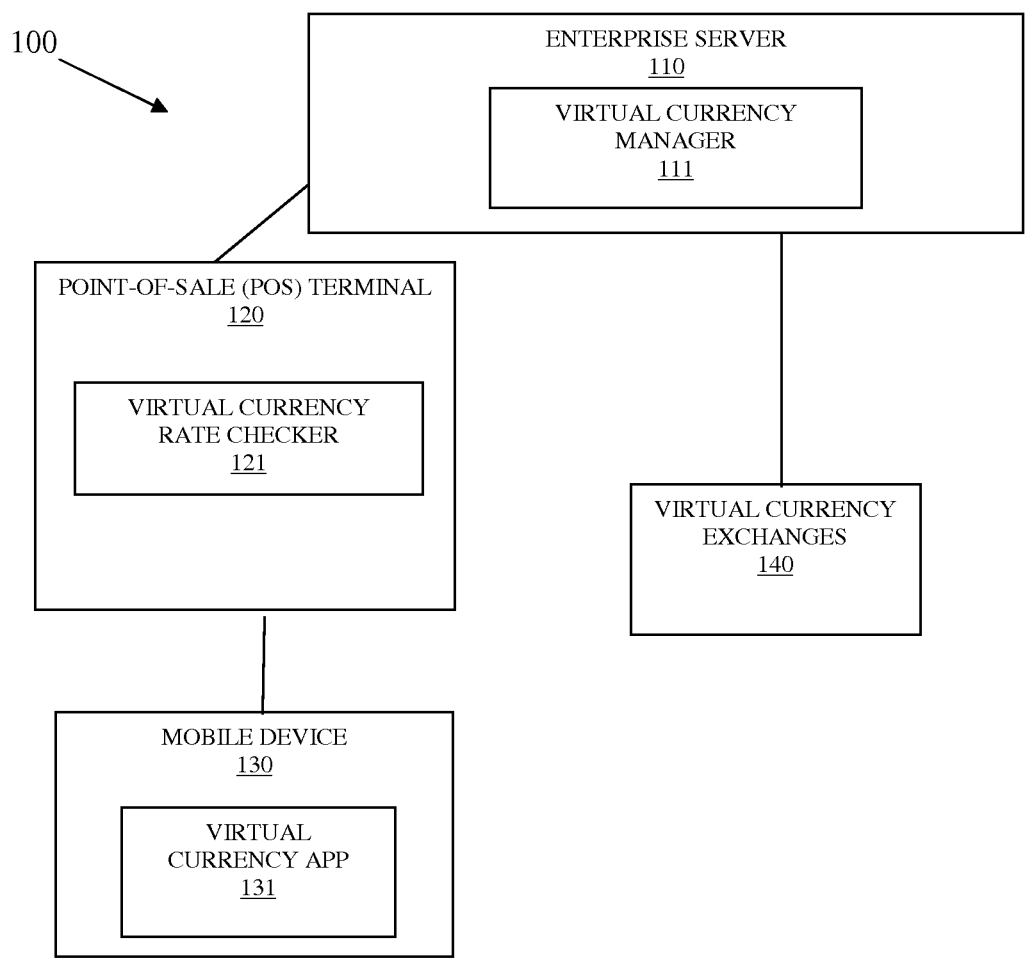
FIG. 1 is a diagram of an enterprise virtual currency management system, according to an example embodiment.

FIG. 1 is a diagram of an enterprise virtual currency management system 100, according to an example embodiment. The components of the enterprise virtual currency management system 100 are shown in greatly simplified form with only those components shown necessary for the understanding of the various embodiments of the invention.

The enterprise virtual currency management system 100 includes an enterprise server 110, a Point-Of-Sale (POS) terminal 120, a mobile device 130, and one or more virtual currency exchanges 140. The enterprise server 110 includes a virtual currency manager 111. The POS terminal 120 includes a virtual currency rate checker 121. The mobile device 130 includes a virtual currency application 131.

It is noted that there are a variety of virtual currencies. One particular currency has remained relatively stable and has garnered widespread support and application; that currency is Bitcoin™. As used here, a "virtual currency" includes Bitcoin™ and any virtual currency available. By definition, a virtual currency is not backed by any government and is therefore not considered to be a currency from the point of view of the government. Legal tender is backed by a particular government and legal tender is not a virtual currency; "legal tender" may be used interchangeably herein with government issued currency.

As used herein the phrase "virtual currency" may be used synonymously and interchangeably with the phrase "crypto currency."

The components of the enterprise virtual currency management system 100 are now discussed within the context of a consumer's transaction at a retail store having the POS terminal 120 for purposes of illustrating various embodiments of the invention.

A consumer desires to purchase a good or service from a retailer with a virtual currency. The consumer has a mobile device 130 with one or more virtual currency applications 131 processing thereon. The consumer has a digital wallet or a mechanism for which the virtual currency can be sent from the consumer to the retailer. The consumer approaches the POS terminal 120 and makes an indication to the cashier that the consumer desires to conclude payment and a transaction using a virtual currency (assuming the POS terminal 120 is cashier assisted—it may be that the POS terminal 120 is a Self-Service Terminal (SST) in which case the consumer selects a virtual currency interface option to proceed with payment via the virtual currency).

The virtual currency rate checker 121 then contacts the virtual currency manager 111 with the desired virtual currency of the customer and the value in legal tender (such as dollars or can be any legal tender such as Euros, etc.). The virtual currency manager 111 accesses an Internet connection and queries a variety of virtual currency exchanges 140 for the current conversion rate for the value in legal tender relative to the virtual currency being used by the consumer for the transaction.

In an embodiment, the virtual currency manager 111 selects the best conversion rate (one that gives the highest value to the legal tender value versus the selected virtual currency).

In an embodiment, the virtual currency manager 111 averages the conversion rate between the available virtual currency exchanges 140.

The amount of virtual concurrency needed to conclude the transaction at the POS terminal 120 based on the selected conversion rate for the customer selected virtual currency is then provided from the virtual currency manager 111 to the virtual currency rate checker 121.

The POS terminal 120 then displays on a display associated with the POS terminal 120 the amount of virtual currency needed for the equivalent value of the legal tender to the customer at the POS terminal 120. In some cases, the amount is displayed to a cashier on the display who communicates or shows the customer the amount needed.

In an embodiment, the amount of virtual currency needed is sent wirelessly to the mobile device 130 of the consumer from the POS terminal 120 (assuming the mobile device 130 and POS terminal 120 are wirelessly paired with one another).

The POS terminal 120 then displays a digital wallet (address of a digital account) as a barcode or Quick Response (QR) code on a display of the POS terminal 120, or the POS terminal 120 prints a QR code. The consumer then scans the QR code (using the mobile device's camera) to acquire the address to the digital wallet of the retailer. The virtual currency application 131 is then accessed by the consumer on the mobile device 130 to transfer a virtual currency amount representing the legal tender total for the consumer's transaction.

In an embodiment, the virtual currency manager 111 continues to monitor the conversion rate between the legal tender value needed to complete the transaction and the value of the consumer selected virtual currency with respect to the legal tender (legal currency) and should more of the selected virtual currency be needed before the customer sends or the POS terminal 120 confirms receipt of the require amount of virtual currency, the virtual currency manager 111 can send a notification to the virtual currency rate checker 121 and a similar process as discussed above can be used to acquire additional amounts of the virtual currency from the consumer.

Once the required amount of virtual currency is received and confirmed by the POS terminal 120 (by indication that the amount of virtual currency is now present in the digital wallet of the POS terminal 120 or retailer associated with the system 400), the POS terminal 120 immediately transfer the amount from its wallet to the retailer's wallet or sends a notification to the virtual currency manager 111 that the funds are present in the retailer's wallet.

The virtual currency manager 111 can elect to immediately exchange the amount of received virtual currency with one of the virtual currency exchanges 140 for legal tender or the virtual currency manager 111 can hold the amount until an event triggers the exchange for legal tender.

The virtual currency manager 111 can monitor the virtual currency exchanges 140 and use data associated with trends for the value of the virtual currency to make a decision as to when to raise an event to exchange the virtual currency for the legal tender. That is, the virtual currency manager 111 maintains a history of conversion rates to develop trends and uses policy rules to decide when an event should be raised to trigger the exchanging of the virtual currency. If a trend is moving downward for the value of the virtual currency relative to the legal tender (may also be referred to as government issued currency), then the virtual currency manager 111 raises an event to exchange out the virtual currency for the government issued currency.

So, the virtual currency manager 111 can pool the virtual currency and hold it for some period of time before exchanging it out. Enterprise policy may dictate how long the holding period can be and when exchanges must occur (for instance if the virtual currency value drops with respect to the government issued currency by more than 5 or 10%, typically equivalent to a retailer's discount). The threshold could be set to not exceed what the cost of goods for the retailer was in a given transaction plus, perhaps, some reasonable profit.

Conversely, the virtual currency manager 111 can use enterprise policy to force an exchange of the virtual currency when a threshold profit was made by the enterprise, such as 10%.

The virtual currency manager 111 can hold multiple different types of virtual currency and can monitor each of the virtual currencies in the manners discussed above.

In an embodiment, the virtual currency manager 111 can also mine news feeds and business feeds for news regarding a virtual currency when performing the trend analysis for the value of the currency. For example, if a news feed indicates Walmart® is accepting Bitcoin™ this may increase the value of the virtual currency substantially over the short run and may be an indication that the virtual currency should be held a bit longer.

In an embodiment, virtual currency manager 111 can be manually overridden to immediately exchange any held virtual currency or a specific virtual currency through a manual override command. This may come from a comptroller of the enterprise for whatever reason.

In an embodiment, the virtual currency manager 111 polls each of the virtual currency exchanges 140 at a preconfigured interval of time.

In an embodiment, the virtual currency manager 111 polls each of the virtual currency exchanges 140 upon detection of an event, such as an override, analysis of an adverse trend, analysis of a news or business feed, etc.

In an embodiment, the virtual currency manager 111 polls each of the virtual currency exchanges 140 at a preconfigured interval of time but immediately does a poll of the exchanges 140 outside a polling period based on the detection of an event.

In an embodiment, the POS terminal 120 is a kiosk.

In an embodiment, the POS terminal 120 is an Automated Teller Machine (ATM).

In an embodiment, the POS terminal 120 is a SST.

In an embodiment, the POS terminal 120 is a cashier-assisted terminal.

Figure 2:
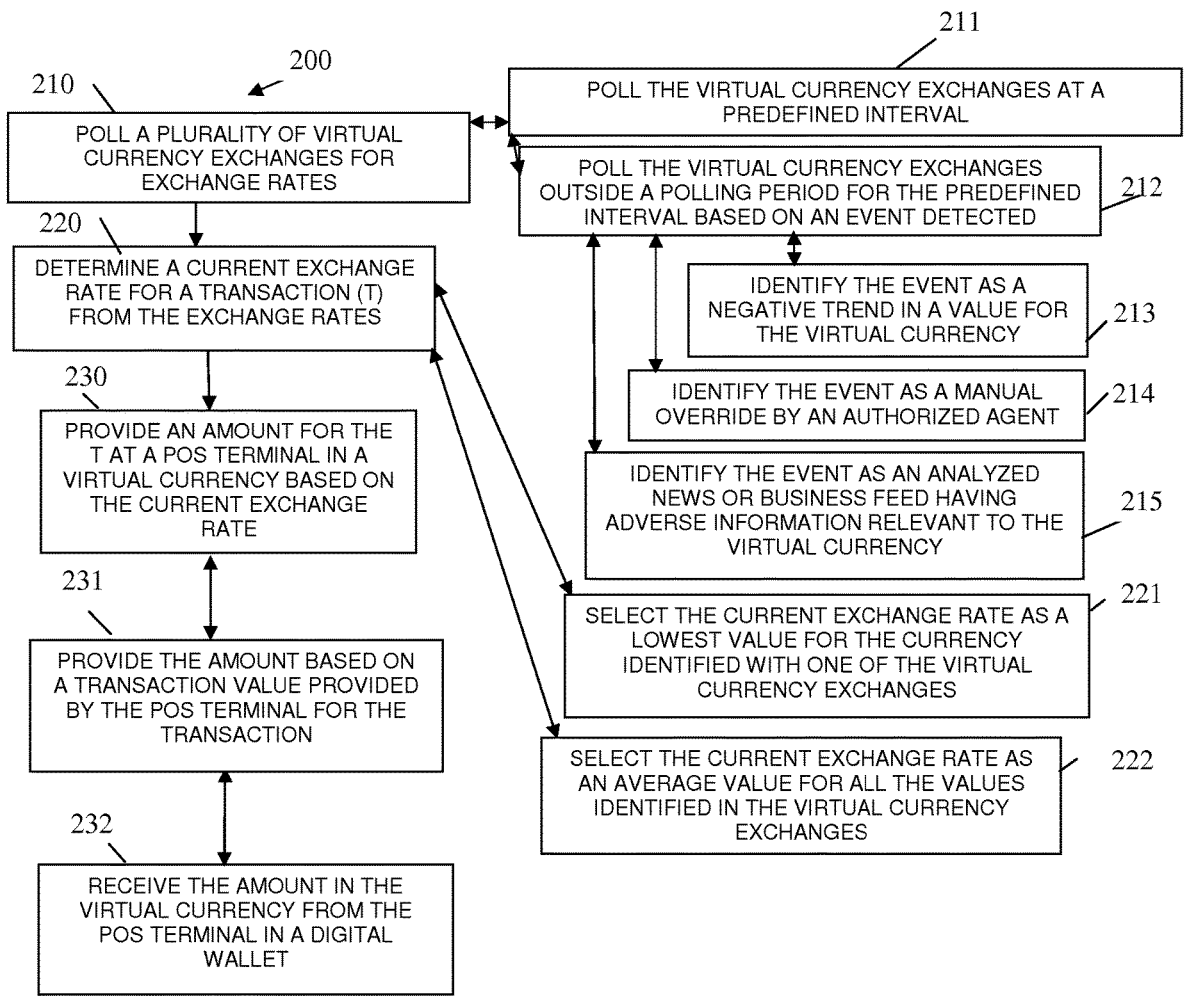
FIG. 2 is a diagram of a method for managing virtual currency within an enterprise, according to an example embodiment.
Figure 3:
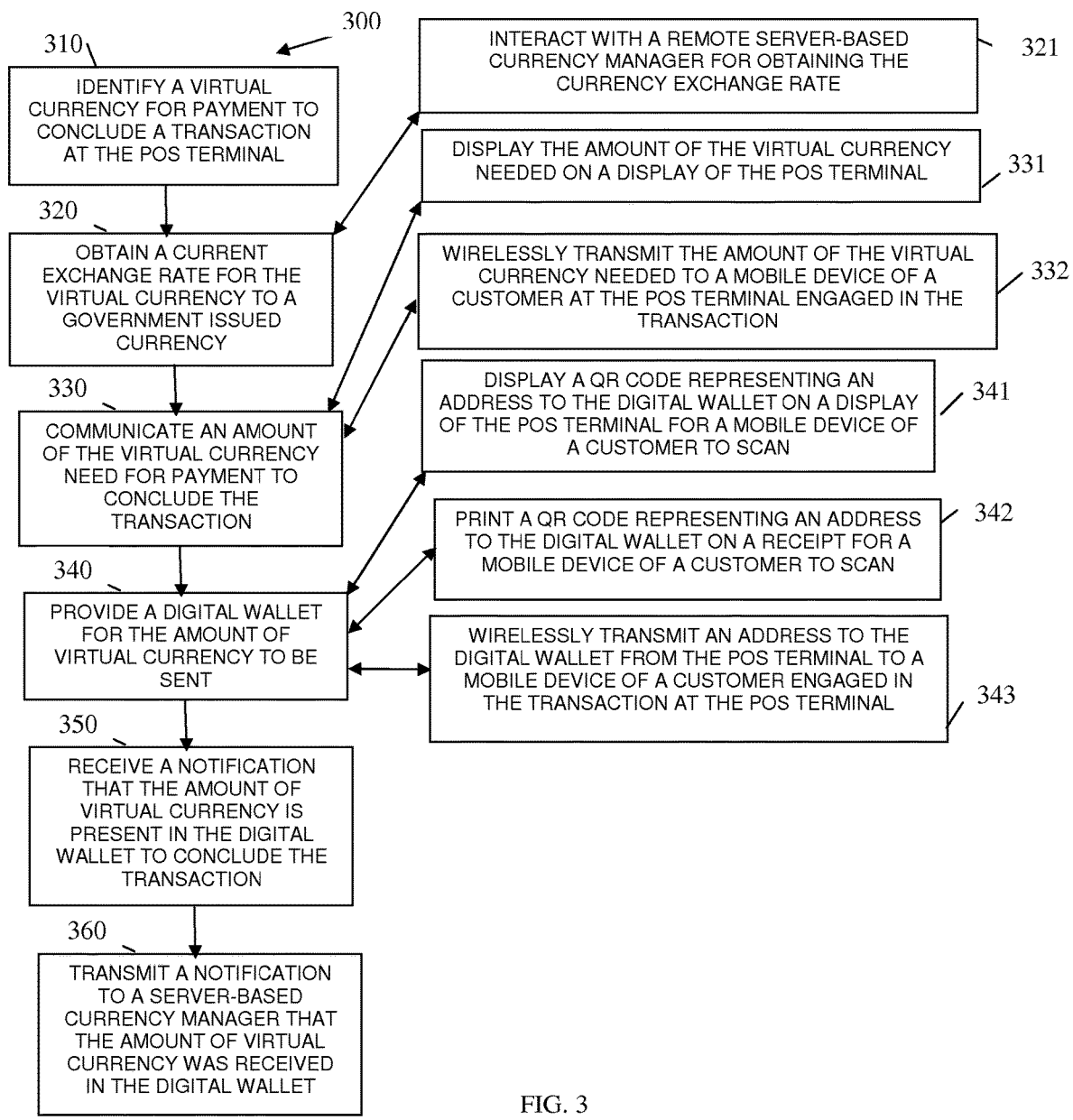
FIG. 3 is a diagram of another method for managing virtual currency within an enterprise, according to an example embodiment.
Figure 4:
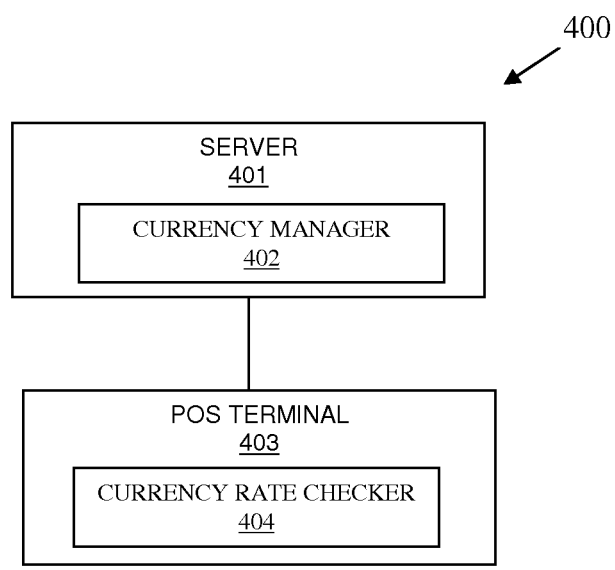
FIG. 4 is a diagram of an enterprise virtual currency management system, according to an example embodiment.

The above-discussed embodiments and other embodiments are now presented with the discussions of the FIGS. 2-4.

FIG. 2 is a diagram of a method 200 for managing virtual currency within an enterprise, according to an example embodiment. The method 200 (hereinafter "server currency manager") is implemented as instructions programmed and residing in memory or on a non-transitory computer-readable (processor-readable) storage medium and executed by one or more processors of one or more devices of a server. The processors are specifically configured and programmed to process the server currency manager. The server currency manager may also operate over one or more networks. The networks are wired, wireless, or a combination of wired and wireless.

In an embodiment, the server currency manager is an instance of the virtual currency manager 111 of the FIG. 1.

In an embodiment, the server currency manager is executed on the enterprise server 110 of the FIG. 1.

In an embodiment, the server currency manager interacts with the POS terminal 120 of the FIG. 1.

In an embodiment, the virtual currency is Bitcoin™.

At 210, the server currency manager polls a plurality of virtual exchange services for exchange rates of virtual currencies. In an embodiment, each exchange rate for a given virtual currencies is weighted, such that some exchange services are viewed more favorably in terms of the quoted exchange rate than other exchange services.

In an embodiment, at 211, the server currency manager polls the virtual exchanges at predefined intervals of time. This can be a configuration parameter to the processing associated with the server currency manager or can be set in a policy condition such that it can be dynamically changed as needed. Other situations for predefining the interval can be used as well.

In an embodiment, of 211 and at 212, the server currency manager polls the virtual exchanges outside a predefined polling period for the predefined interval based on an event detected. So, polling can occur at times other than predefined intervals when detected events warrant such polling.

In an embodiment, of 212 and at 213, the server currency manager identifies the event as a negative trend in value for the virtual currency relative to a given government issued currency.

In another embodiment, of 212 and at 214, the server currency manager identifies the event as a manual override issued by an authorized agent, such as a comptroller or an authorized program associated with the comptroller.

In still another embodiment, of 212 and at 215, the server currency manager identifies the event as analyzed news feeds or business feeds having adverse information relevant to the virtual currency.

At 220, the server currency manager determines a current exchange rate for a transaction from the exchange rates. The current exchange rate is for a given virtual currency being used in the transaction relative to a given government currency that the virtual currency is being exchanged out for.

According to an embodiment, at 221, the server currency manager selects the current exchange rate as a lowest value for the virtual currency identified in one of the virtual exchanges. That is, the most favorable value to the given government currency that the virtual currency is being exchanged to is selected from the exchanges.

In an embodiment, at 222, the server currency manager selects the current exchange rate as an average value for all the values identified in the virtual currency exchanges.

At 230, the server currency manager provides an amount for the transaction at a POS terminal in a virtual currency based on the current exchange rate. So, the POS terminal is instructed to request X amount of the virtual currency to cover the payment for the transaction in a given government issued currency.

In an embodiment, at 231, the server currency manager provides the amount based on a transaction value provided by the POS terminal for the transaction.

In an embodiment, of 231 and at 232, the server currency manager receives the amount in the virtual currency from the POS terminal in a digital wallet.

FIG. 3 is a diagram of another method 300 for managing virtual currency within an enterprise, according to an example embodiment. The method 300 (hereinafter "POS virtual currency manager") is implemented as instruction and programmed within memory or a non-transitory computer-readable (processor-readable) storage medium that executes on one or more processors of one or more devices of a POS terminal; the processors of the devices are specifically configured to execute the POS virtual currency manager. The POS virtual currency manager may also be operational over one or more networks; the networks may be wireless, wired, or a combination of wired and wireless.

The POS virtual currency manager interacts with the server currency manager of the FIG. 2 during POS transactions with customers.

In an embodiment, the POS virtual currency manager is at least partially the virtual currency rate checker 121 of the FIG. 1.

In an embodiment, the POS virtual currency manager executes on the POS terminal 120 of the FIG. 1.

In an embodiment, the POS terminal is a kiosk.

In an embodiment, the POS terminal is a SST.

In an embodiment, the POS terminal is an ATM.

In an embodiment, the POS terminal is a cashier-assisted checkout terminal.

At 310, the POS virtual currency manager identifies a virtual currency for payment to conclude a transaction at a POS terminal. This may be a request from a customer engaged in the transaction with a cashier-assisted POS terminal or may be an interface selection made by the customer at a POS terminal that is a SST.

At 320, the POS virtual currency manager obtains a current exchange rate for the virtual currency to a government issued currency. This can be obtained in the manners discussed above with respect to the FIGS. 1 and 2.

According to an embodiment, at 321, the POS virtual currency manager interacts with a remote server-based currency manager for obtaining the currency exchange rate. For example, the server currency manager of the FIG. 2 or the virtual currency manager 111 of the FIG. 1.

At 330, the POS virtual currency manager communicates an amount of the virtual currency needed for payment to conclude the transaction.

In an embodiment, at 331, the POS virtual currency manager displays the amount of the virtual currency needed on a display of the POS terminal.

In an embodiment, at 332, the POS virtual currency manager wirelessly transmits the amount of the virtual currency needed to a mobile device of a customer at the POS terminal engaged in the transaction. This assumes the POS terminal and the mobile device are wirelessly paired with one another for the transaction at the POS terminal.

At 340, the POS virtual currency manager provides a digital wallet for the amount of the virtual currency to be sent. This is provided by way of an electronic address to locate the digital wallet.

According to an embodiment, at 341, the POS virtual currency manager displays a QR code representing an address to the digital wallet on a display of the POS terminal for a mobile device of a customer to scan.

In an embodiment, at 342, the POS virtual currency manager prints a QR code representing an address to the digital wallet on a receipt for a mobile device of a customer to scan.

In an embodiment, at 343, the POS virtual currency manager wirelessly transmits an address to the digital wallet from the POS terminal to a mobile device of a customer engaged in the transaction at the POS terminal.

At 350, the POS virtual currency manager receives a notification that the amount of virtual currency is present and has been transferred successfully into the digital wallet to conclude the transaction with the customer at the POS terminal.

According to an embodiment, at 360, the POS virtual currency manager transmits a notification to a server-based currency manager that the amount of virtual currency was received in the digital wallet. The server-based currency manager then decides when to exchange out the virtual currency for a given government issued currency (as discussed above in the FIGS. 1-2.

FIG. 4 is a diagram of an enterprise virtual currency management system 400, according to an example embodiment. The components of the enterprise virtual currency management system 400 are implemented as executable instructions and programmed within a non-transitory computer-readable (processor-readable) storage medium that execute on one or more processors of one or more devices; the processors are specifically configured to execute the components of the enterprise virtual currency management system 400. The enterprise virtual currency management system 400 is also operational over one or more networks; any such networks may be wired, wireless, or a combination of wired and wireless.

The enterprise virtual currency management system 400 includes a server 401 having a currency manager 402 and a POS terminal 403 having a currency rate checker 404.

In an embodiment, the server 401 is the enterprise server 110 of the FIG. 1.

In an embodiment, the currency manager 402 is the virtual currency manager 111 of the FIG. 1.

In an embodiment, the currency manager 402 is the method 200 of the FIG. 2.

In an embodiment, the POS terminal 403 is the POS terminal 120 of the FIG. 1.

In an embodiment, the currency rate checker 404 is the virtual currency rate checker 121 of the FIG. 1.

In an embodiment, the currency rate checker 404 is the method 300 of the FIG. 3.

In an embodiment, the POS terminal 403 is a kiosk.

In an embodiment, the POS terminal 403 is a SST.

In an embodiment, the POS terminal 403 is an ATM.

In an embodiment, the POS terminal 403 is a cashier-assisted checkout terminal.

In an embodiment, the server 401 is a grouping of hardware and software resources operating as a cloud processing environment.

The server 401 includes one or more processors, memory, storage devices, and network connections and interfaces.

The currency manager 402 is configured and adapted to: execute on the server 401, continuously poll virtual currency exchanges for a current exchange rate for a virtual currency; and provide the current exchange rate to the currency rate checker 404 for a given transaction at the POS terminal.

According to an embodiment, the currency manager 402 is further adapted and configured to: determine based on trends and policy conditions when to exchange the amount in the virtual currency for an amount in the government issued currency from one of the virtual currency exchanges.

The POS terminal 403 includes one or more processors, memory, storage devices, peripherals, and network connections and interfaces.

The currency rate checker 404 is configured and adapted to: execute on the POS terminal 403, request the current exchange rate from the currency manager for the given transaction, display an amount for a transaction in a virtual currency that is equivalent to a government issued currency value based on the current exchange rate, and obtain the amount in the virtual currency in a digital wallet to conclude the given transaction.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
polling, by a server, a plurality of virtual currency exchanges for exchange rates in response to a virtual currency provided by a Point-Of-Sale (POS) terminal engaged in a transaction, wherein the POS terminal electronically receives the virtual currency as payment for the transaction expecting a government issued currency as payment, wherein polling further includes adjusting a rate of polling based on a history of maintained conversion rates for the virtual currency;
determining, by the server, a current exchange rate for the transaction from the exchange rates based on the virtual currency;
providing, by the server, an amount for the transaction to the POS terminal needed for completing payment of the transaction in the virtual currency based on the current exchange rate;
continue monitoring, by the server, the exchange rates and performing the determining until the POS terminal confirms a receipt of the amount, and when an increase in the amount for the virtual currency is needed for the transaction based on the exchange rates and the determining before confirmation of the receipt is received, instructing the POS terminal that an increase in the amount of the virtual currency is needed to complete the transaction; and
exchanging, by the server, the amount in the virtual currency for an equivalent amount of the government issued currency based on a down trend in a virtual currency value relative to the government issued currency when dictated by a policy evaluation that generates an exchange event to trigger the exchanging, wherein the policy evaluation further includes a threshold set or a cost of one or more goods associated with the transaction plus a retailer defined profit, the threshold representing a government issued currency amount and generating the exchange event when the current exchange rate for the amount of the virtual currency equals the threshold, wherein exchanging further includes mining news feeds and business feeds and delaying the exchange event when the mining indicates through the news feeds that the virtual currency is being accepted by a business for payment indicating that the virtual currency value may increase in value, and when the news feeds or the business feeds indicate the virtual currency is being accepted by the business immediately polling the virtual currency exchanges for the exchange rates outside a predefined interval associated with polling the virtual currency exchanges.

2. The method of claim 1, wherein polling further includes polling the virtual currency exchanges at the predefined interval.

3. The method of claim 2, wherein polling further includes identifying the event as a negative trend in a value for the virtual currency.

4. The method of claim 2, wherein polling further includes identifying the event as a manual override by an authorized agent.

5. The method of claim 2, wherein polling further includes identifying the event as an analyzed news or business feed having adverse information relevant to the virtual currency.

6. The method of claim 1, wherein determining further includes selecting the current exchange rate as a lowest value for the currency identified with one of the virtual currency exchanges.

7. The method of claim 1, wherein determining further includes selecting the current exchange rate as an average value for all the values identified in the virtual currency exchanges.

8. The method of claim 1, wherein providing further includes providing the amount based on a transaction value provided by the POS terminal for the transaction.

9. The method of claim 8 further comprising, receiving, by the server, the amount in the virtual currency from the POS terminal in a digital wallet.

10. A method, comprising:
   identifying, at a Point-Of-Sale (POS) terminal, a virtual currency provided as payment to conclude a transaction at the POS terminal;
   obtaining, by the POS terminal, a current exchange rate for the virtual currency to a government issued currency expected by the POS as payment for the transaction from a virtual currency manager that maintains a hi story of maintained conversion rates for the virtual currency;
   communicating, by the POS terminal, an amount of the virtual currency needed for payment to conclude the transaction;
   providing, by the POS terminal, a digital wallet for the amount of virtual currency to be sent;
   receiving, by the POS terminal, a notification that the amount of virtual currency is present in the digital wallet to conclude the transaction;
   re-communicating, by the POS terminal, an increase in the amount of the virtual currency needed for the transaction when the virtual currency manager indicates a particular value of the virtual currency decreased relative to a government issued currency and before the POS terminal receives the notification in the receiving; and
   exchanging, by the POS terminal, the amount in the virtual currency for an equivalent amount of the government issued currency based on a down trend in a virtual currency value relative to the government issued currency when dictated by a policy evaluation that generates an exchange event to trigger the exchanging, wherein the policy evaluation further includes a threshold set for a cost of one or more goods associated with the transaction plus a retailer defined profit, the threshold representing the government issued currency amount and generating the exchange event when the current exchange rate for the amount of the virtual currency equals the threshold, wherein exchanging further includes mining news feeds and business feeds and delaying the exchange event when the mining indicates through the news feeds that the virtual currency is being accepted by a business for payment indicating that the virtual currency value may increase in value, and when the news feeds or the business feeds indicate the virtual currency is being accepted by the immediately polling virtual currency exchanges for the exchange rate outside a preconfigured interval associated with polling the virtual currency exchanges.

11. The method of claim 10, wherein obtaining further includes interacting with a remote server-based currency manager for obtaining the currency exchange rate.

12. The method of claim 10, wherein communicating further includes displaying the amount of the virtual currency needed on a display of the POS terminal.

13. The method of claim 10, wherein communicating further includes wirelessly transmitting the amount of the virtual currency needed to a mobile device of a customer at the POS terminal engaged in the transaction.

14. The method of claim 10, wherein providing further includes displaying a Quick Response (QR) code representing an address to the digital wallet on a display of the POS terminal for a mobile device of a customer to scan.

15. The method of claim 10, wherein providing further includes printing a Quick Response (QR) code representing an address to the digital wallet on a receipt for a mobile device of a customer to scan.

16. The method of claim 10, wherein providing further includes wirelessly transmitting an address to the digital wallet from the POS terminal to a mobile device of a customer engaged in the transaction at the POS terminal.

17. The method of claim 10 further comprising, transmitting, by the POS terminal, a notification to a server-based currency manager that the amount of virtual currency was received in the digital wallet.

18. A system comprising:
   a server having a currency manager;
   a Point-Of-Sale (POS) terminal having a currency rate checker;
   the currency manager configured and adapted to:
   i) execute on the server, ii) continuously poll virtual currency exchanges for a current exchange rate for a virtual currency and adjust polling rates based on a history of maintained conversion rates for the virtual currency;
   iii) provide the current exchange rate to the currency rate checker for a given transaction at the POS terminal and update the current exchange rate with the currency rate checker during the given transaction and before the POS terminal confirms a receipt of any virtual currency for the given transaction when the current exchange rate decreases in a particular value before the receipt is obtained, and iv) exchange the amount in the virtual currency for an equivalent amount of a government issued currency based on a down trend in a virtual currency value relative to the government issued currency when dictated by a policy evaluation that generates an exchange event to trigger the exchange of the amount in the virtual currency to the equivalent amount of the government issued currency, wherein the policy evaluation further includes a threshold set for a cost of one or more goods associated with the given transaction plus a retailer defined profit, the threshold representing a government issued currency amount and generating the exchange event when the current exchange rate for the amount of the virtual currency equals the threshold, and mine news feeds and business feeds and delay the exchange event when the news feeds and the business feeds indicate through the news feeds that the virtual currency is being accepted by a business for payment indicating that the virtual currency value may increase in value, and when the news feeds or the business feeds indicate the virtual currency is being accepted by the business immediately polling the virtual currency exchanges for the exchange rate outside a preconfigured interval associated with polling the virtual currency exchanges; and the currency rate checker configured and adapted to:
i) request the current exchange rate from the currency manager for the given transaction, ii) display an amount for a transaction in a virtual currency that is equivalent to the government issued currency value based on the current exchange rate, and re-display an increase in the amount for the transaction when an update in the current exchange rate is received from the currency manager before the receipt of the amount of the virtual currency is obtained, and iii) obtain the amount in the virtual currency in a digital wallet to conclude the given transaction.

19. The system of claim 18, wherein the currency manager is further adapted and configured to: determine based on trends and policy conditions when to exchange the amount in the virtual currency for an amount in the government issued currency from one of the virtual currency exchanges.

* * * * *